US012592102B2

(12) United States Patent
Miura et al.

(10) Patent No.: US 12,592,102 B2
(45) Date of Patent: Mar. 31, 2026

(54) OPERATION DATA SUPPORT SYSTEM FOR INDUSTRIAL MACHINERY

(71) Applicant: KUBOTA CORPORATION, Osaka (JP)

(72) Inventors: Keisuke Miura, Osaka (JP); Ryo Ikeda, Osaka (JP); Yoshihito Iida, Osaka (JP); Kenji Ishihara, Osaka (JP)

(73) Assignee: KUBOTA CORPORATION, Osaka (JP)

(*) Notice: Subject to any disclaimer, the term of this patent is extended or adjusted under 35 U.S.C. 154(b) by 163 days.

(21) Appl. No.: 18/529,094

(22) Filed: Dec. 5, 2023

(65) Prior Publication Data

US 2024/0212398 A1 Jun. 27, 2024

(30) Foreign Application Priority Data

Dec. 26, 2022 (JP) ................................ 2022-208359

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC ..... G07C 5/008; G07C 5/085; G05B 23/0264
USPC ........................................................ 701/31.4
See application file for complete search history.

(56) References Cited

U.S. PATENT DOCUMENTS

| | | | | |
|---|---|---|---|---|
| 10,000,911 | B2 * | 6/2018 | You | G07C 5/0841 |
| 2008/0148171 | A1 * | 6/2008 | Ananth | G06Q 10/00 715/772 |
| 2017/0002549 | A1 * | 1/2017 | You | G07C 5/0816 |
| 2017/0134239 | A1 * | 5/2017 | Mahoney | H04L 69/22 |
| 2020/0279320 | A1 * | 9/2020 | Stewart | H04N 21/23614 |
| 2021/0080939 | A1 * | 3/2021 | Yarmus | G05B 23/0254 |
| 2024/0212398 | A1 * | 6/2024 | Miura | G07C 5/085 |

FOREIGN PATENT DOCUMENTS

JP 2011-74639 A 4/2011

OTHER PUBLICATIONS

European Search Report dated May 31, 2024 issued in European family member application No. 23 21 6471.

* cited by examiner

*Primary Examiner* — Tyler D Paige
(74) *Attorney, Agent, or Firm* — GREENBLUM & BERNSTEIN, P.L.C.

(57) ABSTRACT

An operation data support system for industrial machinery includes a first memory, a second memory, a communication device, and a control device. The first memory stores, with a ring buffer, operation data regarding a backhoe. The second memory is different from the first memory and stores operation data. The communication device transmits, outward from the backhoe, the operation data stored in either the first memory or the second memory. The control device controls the first memory, the second memory, and the communication device. When acquiring a transmission command for operation data, the control device stops storage of operation data with the ring buffer in the first memory and additionally causes the communication device to transmit first operation data stored in the first memory.

5 Claims, 8 Drawing Sheets

OPERATION DATA SUPPORT SYSTEM FOR INDUSTRIAL MACHINERY

CROSS-REFERENCE TO RELATED APPLICATION

This application is based upon and claims the benefit of priority from Japanese Patent Application No. 2022-208359 filed on Dec. 26, 2022 in Japan, the entire contents of which are incorporated herein by reference.

TECHNICAL FIELD

The present invention relates to an operation data support system for supporting communication or use of operation data regarding industrial machinery, such as agricultural machinery and construction machinery.

RELATED ART

Conventionally, as a system for diagnosing a failure of a work machine, there is a failure diagnosis support system in JP 2011-74639 A (claim 1, paragraph 0022, and the like). In the failure diagnosis support system in JP 2011-74639 A (claim 1, paragraph 0022, and the like), an operation status of each part of the work machine is converted into an image. The image is read and transmitted as an operation status to an external terminal via a network. In a case where the terminal receives the operation status, a failure is automatically estimated on the basis of the operation status and a repair record.

In the system in JP 2011-74639 A (claim 1, paragraph 0022, and the like), operation information of the work machine is converted into an image of a QR code (registered trademark) at a timing at which diagnosis is requested. An operation status is transmitted to an external terminal by reading the image. On the other hand, in a case where only the operation information at the timing at which diagnosis is required is used, an amount of information for diagnosis may be reduced, and it is difficult to easily and accurately execute diagnosis. As information to be transmitted to the terminal, for example, a continuous temporal change at a level at which a change tendency can be appropriately analyzed is preferable in many cases. JP 2011-74639 A (claim 1, paragraph 0022, and the like) does not disclose a technique related to this viewpoint. As described above, there is a demand for a technique for easily and accurately executing diagnosis of a part of an industrial machine at a place remote from the industrial machine.

Therefore, in view of the above problems, an object of the present invention is to provide an industrial machine and a communication system of the industrial machine capable of easily and accurately performing diagnosis of a part of the industrial machine at a place remote from the industrial machine.

SUMMARY

The technical means of the present invention for solving this technical problem is characterized by the following points. An operation data support system for industrial machinery according to the present invention, includes: a first memory device with which the industrial machinery is provided, the first memory device storing, with a ring buffer, operation data regarding the industrial machinery; a second memory device with which the industrial machinery is provided, the second memory device being different from the first memory device, the second memory device storing the operation data; a communication device with which the industrial machinery is provided, the communication device b transmitting, outward from the industrial machinery, the operation data stored in either the first memory device or the second memory device; and a control device with which the industrial machinery is provided, the control device controlling the first memory device, the second memory device, and the communication device. When acquiring a transmission command for the operation data, the control device stops storage of the operation data with the ring buffer in the first memory device and additionally causes the communication device to transmit the operation data stored in the first memory device.

In the operation data support system according to the present invention, when acquiring the transmission command for the operation data, the control device make a switch from the first memory device to the second memory device for storage of the operation data.

In the operation data support system according to the present invention, when a transmission amount of the operation data stored in the first memory device reaches a threshold or more, the control device resumes storage of the operation data with the ring buffer in the first memory device.

In the operation data support system according to the present invention, when a transmission amount of the operation data stored in the first memory device reaches a threshold or more, the control device causes the communication device to transmit the operation data stored in the second memory device.

In the operation data support system according to the present invention, the control device is capable of stopping storage of the operation data into the second memory device.

The operation data support system according to the present invention, further includes a third memory device with which the industrial machinery is provided, the third memory device being different from the first memory device and the second memory device, the third memory device storing the operation data. The control device controls the third memory device, and stores, during transmission of the operation data stored in the second memory device, the operation data into the third memory device.

In the operation data support system according to the present invention, the first memory device and the second memory device are integrated together.

According to the present invention, it is possible to easily and accurately perform diagnosis of a part of the industrial machine at a place remote from the industrial machine. Especially, it is possible to easily and accurately perform the diagnosis when performing diagnosis of the operation data.

DETAILED DESCRIPTION

Hereinafter, embodiments of the present invention will be described with reference to the drawings.

First Embodiment

Communication System of Industrial Machine

Figure 8:
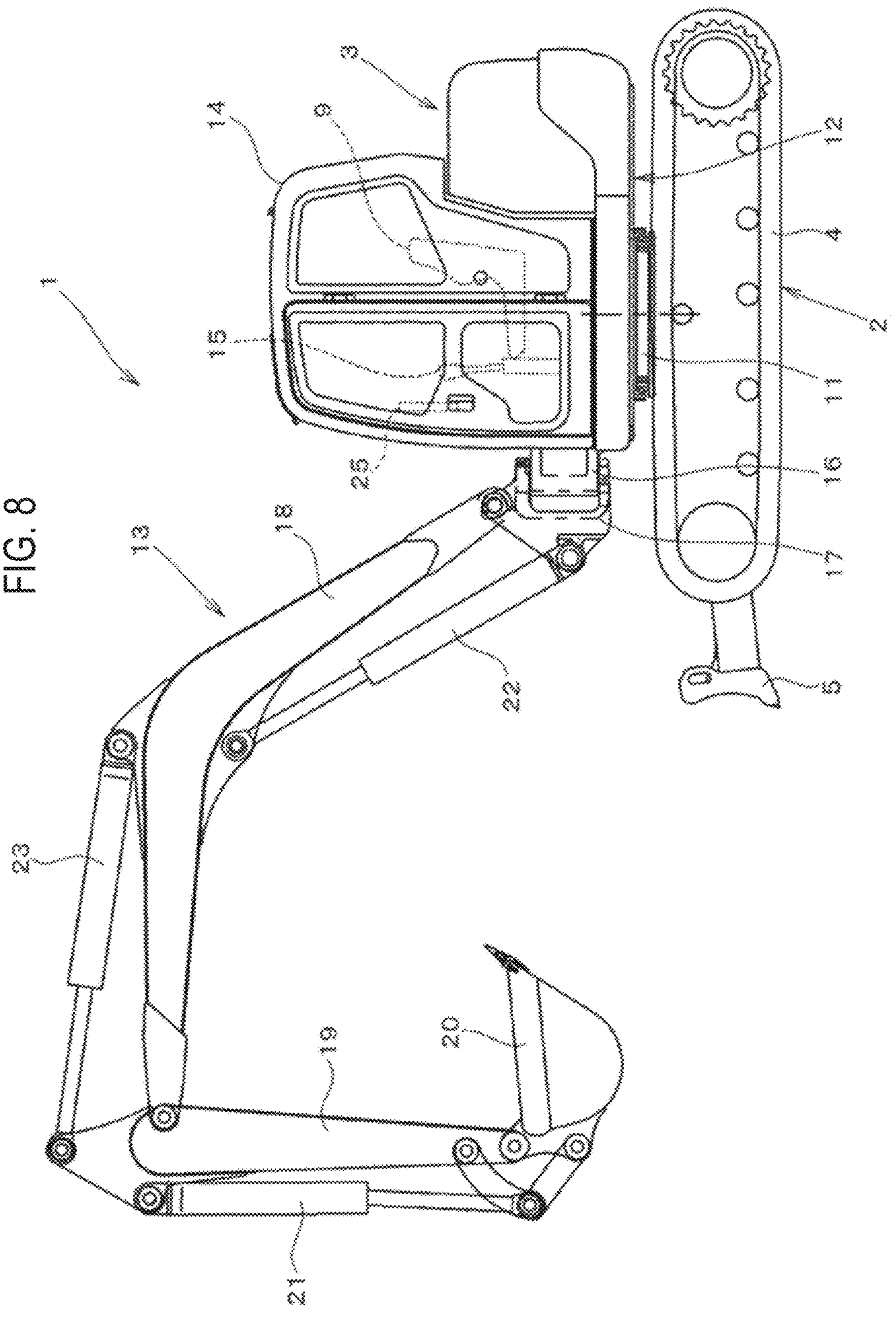
FIG. 8 is a side view of the industrial machine (backhoe) illustrated in FIG. 1.

FIG. 8 illustrates an example of an industrial machine in a communication system S of the industrial machine of the present invention. In the present embodiment, the industrial machine will be described as a backhoe 1 that is a turning work machine. Note that an industrial machine applied to the communication system S of the industrial machine of the present invention is not limited to the industrial machine illustrated in this embodiment. Instead of the backhoe 1, the industrial machine may be, for example, a construction machine such as a loader, or an agricultural machine such as a tractor, a combine harvester, or a rice transplanter.

The backhoe 1 includes a lower traveling device 2 and an upper turning body 3. The traveling device 2 includes a pair of left and right traveling bodies 4 having a cover band. As the traveling device 2, a crawler traveling device in which each traveling body 4 is driven by a traveling motor M is adopted. A dozer 5 is provided at a front portion of the traveling device 2.

The turning body 3 includes a turning base 12 and a work device 13 provided at a front portion of the turning base 12. The turning base 12 is supported on the traveling device 2 via a turning bearing 11 to be turnable laterally about a vertical turning axis. An engine, a radiator, a driver's seat 9, a fuel tank, a hydraulic oil tank, and the like are provided on the turning base 12. A display device 25 that displays various types of information related to the backhoe 1 is provided around the driver's seat 9. The driver's seat 9 is surrounded by a cabin 14 provided on the turning base 12.

The work device 13 includes a swing bracket 17, a boom 18, an arm 19, and a bucket 20. The swing bracket 17 is supported by a support bracket 16 to be swingable laterally about a vertical axis. The support bracket 16 is provided at the front portion of the turning base 12 to be offset slightly rightward from the central portion in the left-right direction. The swing bracket 17 swings through extension and contraction of a swing cylinder provided in the turning base 12.

The base side of the boom 18 is pivotally attached to the swing bracket 17 to be rotatable about the axis in the left-right direction, and the boom 18 is supported to be vertically swingable. The boom 18 swings through extension and contraction of a boom cylinder 22 interposed between the boom 18 and the swing bracket 17. A base side of an arm 19 is pivotally attached to a distal end side of the boom 18 to be rotatable about the axis in the left-right direction, and the arm 19 is supported to be swingable back and forth.

The arm 19 swings through extension and contraction of an arm cylinder 23 interposed between the arm 19 and the boom 18. On the distal end side of the arm 19, a bucket 20 is provided to be capable of performing a squeeze dumping operation. The bucket 20 executes the squeeze dumping operation through extension and contraction of a bucket cylinder 21 interposed between the bucket 20 and the arm 19.

In the work device 13, other work tools (spare attachments) can be mounted instead of or in addition to the bucket 20. Examples of the other work tools (spare attachments) include work tools that can be driven by a hydraulic actuator, such as a hydraulic breaker, a hydraulic crusher, an angle bloom, an earth auger, a pallet fork, a sweeper, a mower, and a snow blower.

Figure 1:
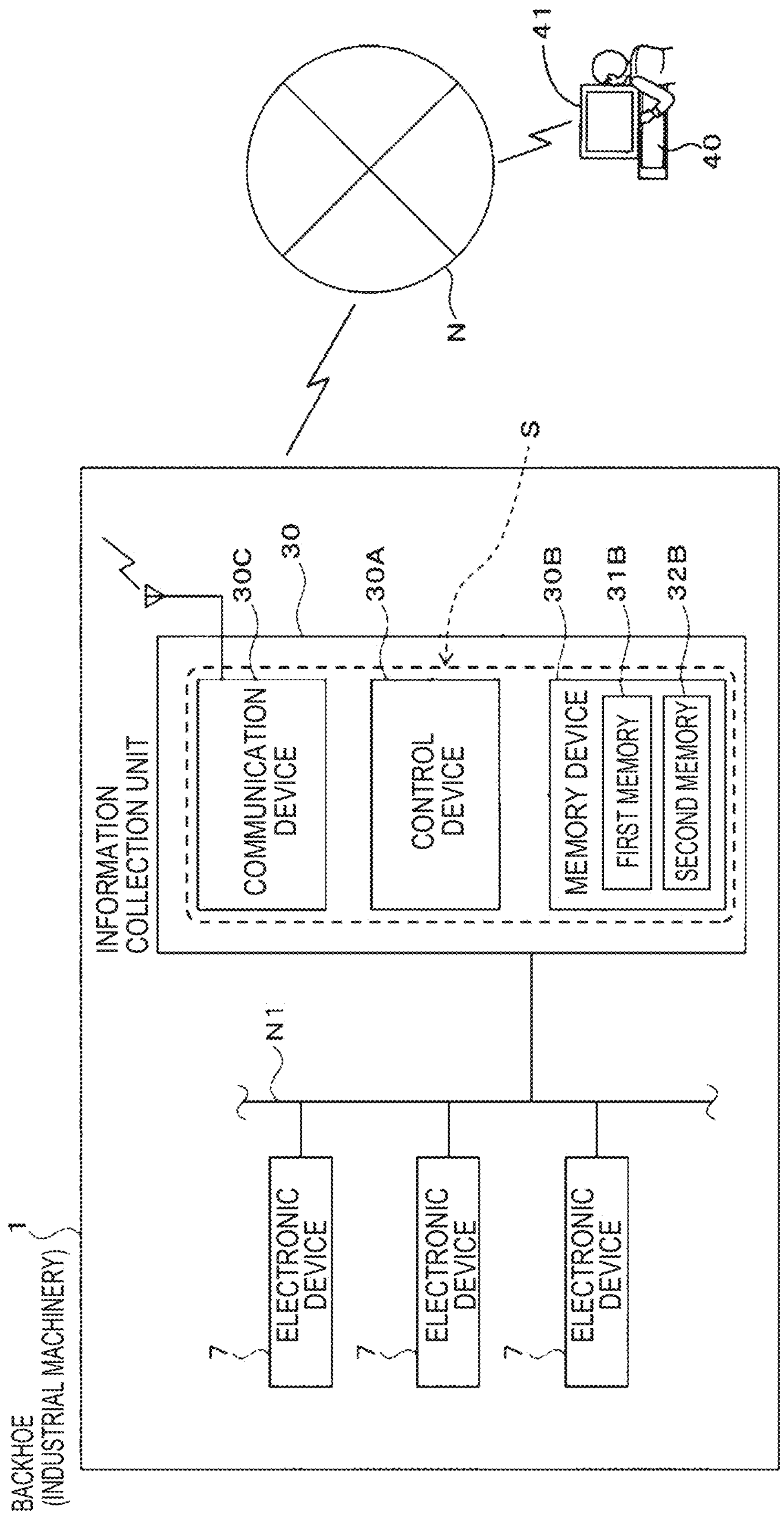
FIG. 1 illustrates functional blocks of a backhoe including an operation data support system for industrial machinery (backhoe) according to a first embodiment of the present invention, an information-communication network, and a terminal device.

As illustrated in FIG. 1, a backhoe 1 includes a plurality of electronic devices 7, an in-vehicle network N1, an information collection unit 30, and an operation data support system S. The electronic device 7 may be a sensor or the like that acquires a state or an operating status of a part configuring the industrial machine. In the present embodiment, the electronic device 7 is a rotational speed sensor, a fuel sensor, a water temperature sensor, a hydraulic sensor, a potentiometer, or the like, but is not limited thereto.

The rotation speed sensor is provided in the engine of the backhoe 1 and transmits an output signal corresponding to an engine rotation speed. The fuel sensor is provided in the fuel tank of the backhoe 1 and transmits an output signal corresponding to a remaining amount of fuel. The water temperature sensor is provided in a cooling water circuit connecting the engine and the radiator of the backhoe 1, and transmits an output signal corresponding to a water temperature. The hydraulic sensor is provided in the hydraulic oil tank and the hydraulic cylinder of the backhoe 1, and transmits an output signal corresponding to the presence or absence of oil or a cylinder pressure. The potentiometer is provided at a predetermined part of the work device 13, and transmits an output signal corresponding to a rotation angle of the boom 18, the arm 19, or the bucket 20.

The in-vehicle network N1 performs data communication in the plurality of electronic devices 7 mounted on the backhoe 1 (industrial machine). The in-vehicle network N1 is connected to the electronic devices 7 and the information collecting unit 30. Therefore, each output signal transmitted from the electronic device 7 is input to the information collecting unit 30 via the in-vehicle network N1. As the in-vehicle network N1, for example, a protocol such as CAN, Ethernet (registered trademark), or BroadR-Reach (registered trademark) may be used, but the in-vehicle network N1 is not limited thereto.

The information collecting unit 30 samples various input output signals at a sampling cycle (for example, 10 to 30 milliseconds) on the order of milliseconds. The output signal from the electronic device 7 sampled by the information collecting unit 30 is configured as in-vehicle data. In the present embodiment, the in-vehicle data is a graph corresponding to an output signal from each electronic device 7, and corresponds to a graph indicating a continuous temporal change for each sampling cycle (refer to FIG. 4).

Operation data regarding the backhoe 1 is transmitted from the information collection unit 30 to a terminal device 40 through an information-communication network N. In the present embodiment, in response to a transmission command for operation data from the terminal device 40, the operation data in the information collection unit 30 is directly transmitted. Herein, the expression "directly transmitted" means that the operation data is transmitted without any change from the information collection unit 30 to the information-communication network N, except for processing/computing for communication (e.g., processing/computing for a header and a packet). The operation data to be transmitted from the information collection unit 30 may be "directly transmitted" at least partially.

In order to achieve such transmission of operation data as described above, the information collection unit 30 includes the operation data support system S. The operation data support system S includes a control device 30A, a memory device 30B, and a communication device 30C.

The control device 30A, with which the backhoe 1 (industrial machinery) is provided, controls the memory device 30B (first and second memories 31B and 32B to be described later) and the communication device 30C. The control device 30A includes a CPU and performs predetermined control based on a program. More specifically, the control device 30A samples the output signal from an electronic device 7 input to the information collection unit 30 and performs processing to store the output signal as operation data into the memory device 30B. When acquiring a transmission command for operation data from the terminal device 40, the control device 30A performs processing to switch the memory part for operation data in the memory device 30B. When acquiring a transmission command for operation data from the terminal device 40, the control device 30A instructs the communication device 30C to transmit the operation data in the memory device 30B.

The memory device 30B includes a first memory 31B (first memory device) and a second memory 32B (second memory device). The first memory 31B and the second memory 32B each temporarily store operation data before the communication device 30C transmits the operation data to the information-communication network N.

The first memory 31B, with which the backhoe 1 (industrial machinery) is provided, stores, with a ring buffer, operation data regarding the backhoe 1. Every time new operation data is stored with the ring buffer, the old operation data having been stored is deleted. Thus, the latest necessary operation data is only stored into the first memory 31B, so that the amount of operation data to be stored can be made to the minimum necessary. The second memory 32B, with which the backhoe 1 (industrial machinery) is provided, is different from the first memory 31B and stores operation data regarding the backhoe 1. The first memory 31B and the second memory 32B are integrated together in the memory device 30B.

The first memory 31B includes a volatile memory, such as a RAM. In a case where the first memory 31B includes a RAM, the RAM may include n number of lanes, such as RAM1, RAM2, . . . , and RAMn. The second memory 32B includes a nonvolatile memory, such as an eMMC. In a case where the second memory 32B includes an eMMC, the eMMC may include n number of lanes, such as eMMC1, eMMC2, . . . , and eMMCn. The plurality of lanes in the first memory 31B may be associated one-to-one with the plurality of lanes in the second memory 32B, such as (RAM1, eMMC1), (RAM2, eMMC2), . . . , and (RAMn, eMMCn). Operation data to be stored in each lane may be different. During switching or transmitting due to a transmission command for operation data to a lane, other operation data may be stored in another lane.

The control device 30A is capable of making a switch between the first memory 31B and the second memory 32B for storage of operation data in the memory device 30B. The control device 30A is capable of stopping storage of operation data with the ring buffer in the first memory 31B or storage of operation data into the second memory 32B. In the present embodiment, during storage of operation data into the first memory 31B, the control device 30A keeps storage of operation data stopped to the second memory 32B. During storage of operation data into the second memory 32B due to switching by the control device 30A, storage of operation data is kept stopped to the first memory 31B (refer to FIG. 4).

The communication device 30C establishes a connection between the in-vehicle network N1 and the information-communication network N. The information-communication network N is located outside the backhoe 1 and is different from the in-vehicle network N1. The information-communication network N corresponds to a mobile communication network or a data communication network, such as LTE (registered trademark) or 4th/5th generation communication system. The communication device 30C transmits, by wireless communication, to the information-communication network N, operation data based on data communication with the plurality of electronic devices 7 through the in-vehicle network N1.

In response to a transmission command for operation data from the terminal device 40, the control device 30A causes the communication device 30C to transmit the operation data stored in the memory device 30B to the terminal device 40 through the information-communication network N. In the present embodiment, when acquiring a transmission command for operation data from the terminal device 40, the control device 30A instructs the communication device 30C to transmit the operation data stored in the first memory 31B and the operation data stored in the second memory 32B. Note that an aspect of switching of the memory part for operation data and an aspect of transmission of operation data will be described later.

Figure 2:
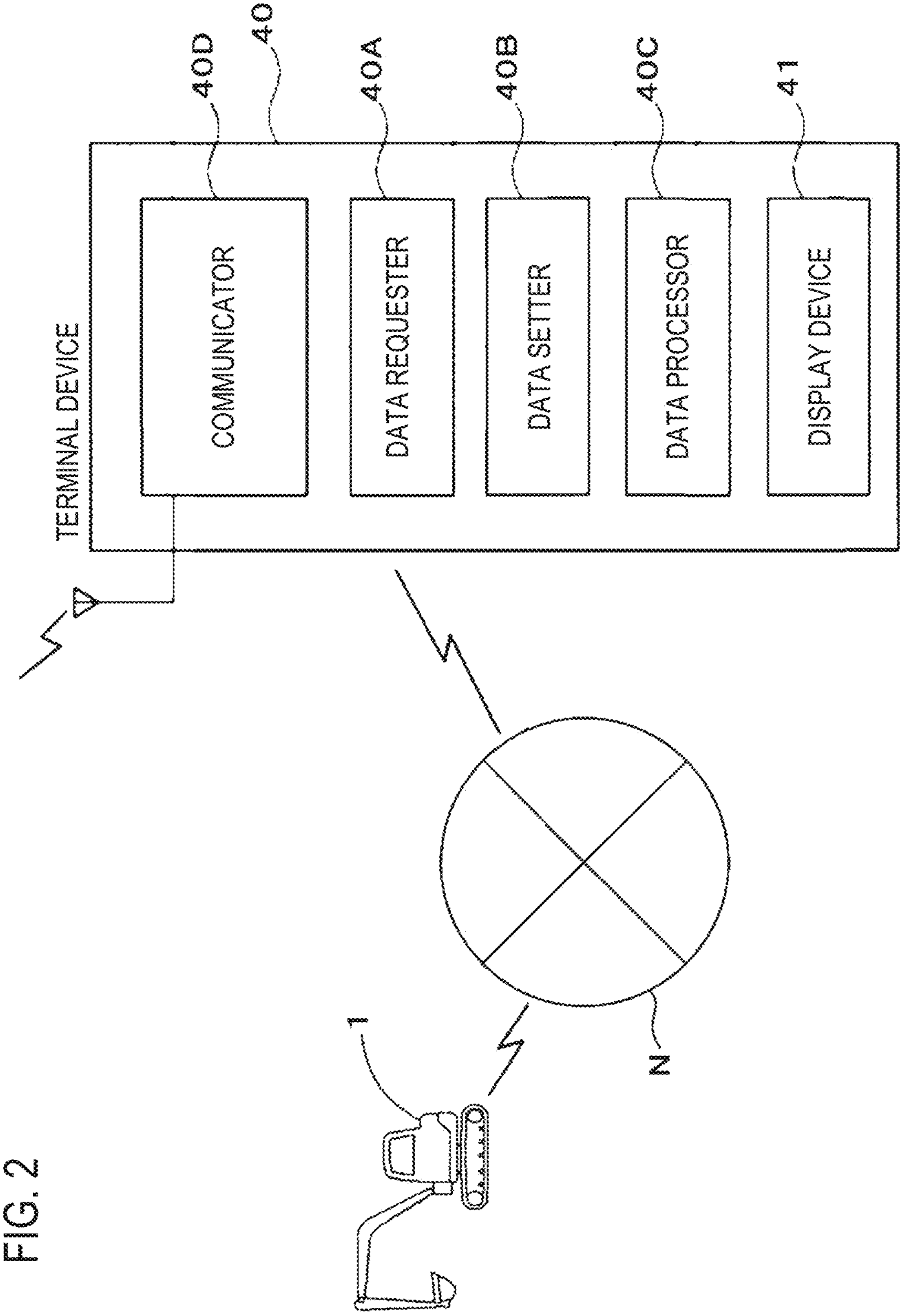
FIG. 2 illustrates functional blocks of the terminal device, the information-communication network, and the backhoe illustrated in FIG. 1.

As illustrated in FIG. 2, the terminal device 40 includes a data request portion 40A, a data setting portion 40B, a data processing portion 40C, a communication portion 40D, and a display device 41. In the present embodiment, the terminal device 40 is an installation type server connectable to the information communication network N, but may be, for example, a portable computer such as a smartphone, a tablet PC, or a laptop PC. The terminal device 40 is located at a place remote from the backhoe 1, and may be installed in, for example, a rental company, a repair company, or a manufacturer.

The data request portion 40A, the data setting portion 40B, and the data processing portion 40C include an electric/electronic circuit, a CPU, a program, and the like. The data request portion 40A requests the information collecting unit 30 to transmit the in-vehicle data to the terminal device 40 via the information communication network N. The data setting portion 40B sets a range of the in-vehicle data transmitted from the communication device 30C of the information collecting unit 30 via the information communication network N. As a result, a range of the in-vehicle data to be transmitted to the information communication network N by the communication device 30C among the pieces of in-vehicle data stored in the storage device 30B can be changed. The data processing portion 40C executes a process of processing the in-vehicle data transmitted from the communication device 30C of the information collecting unit 30 into visualized data.

Figure 3:
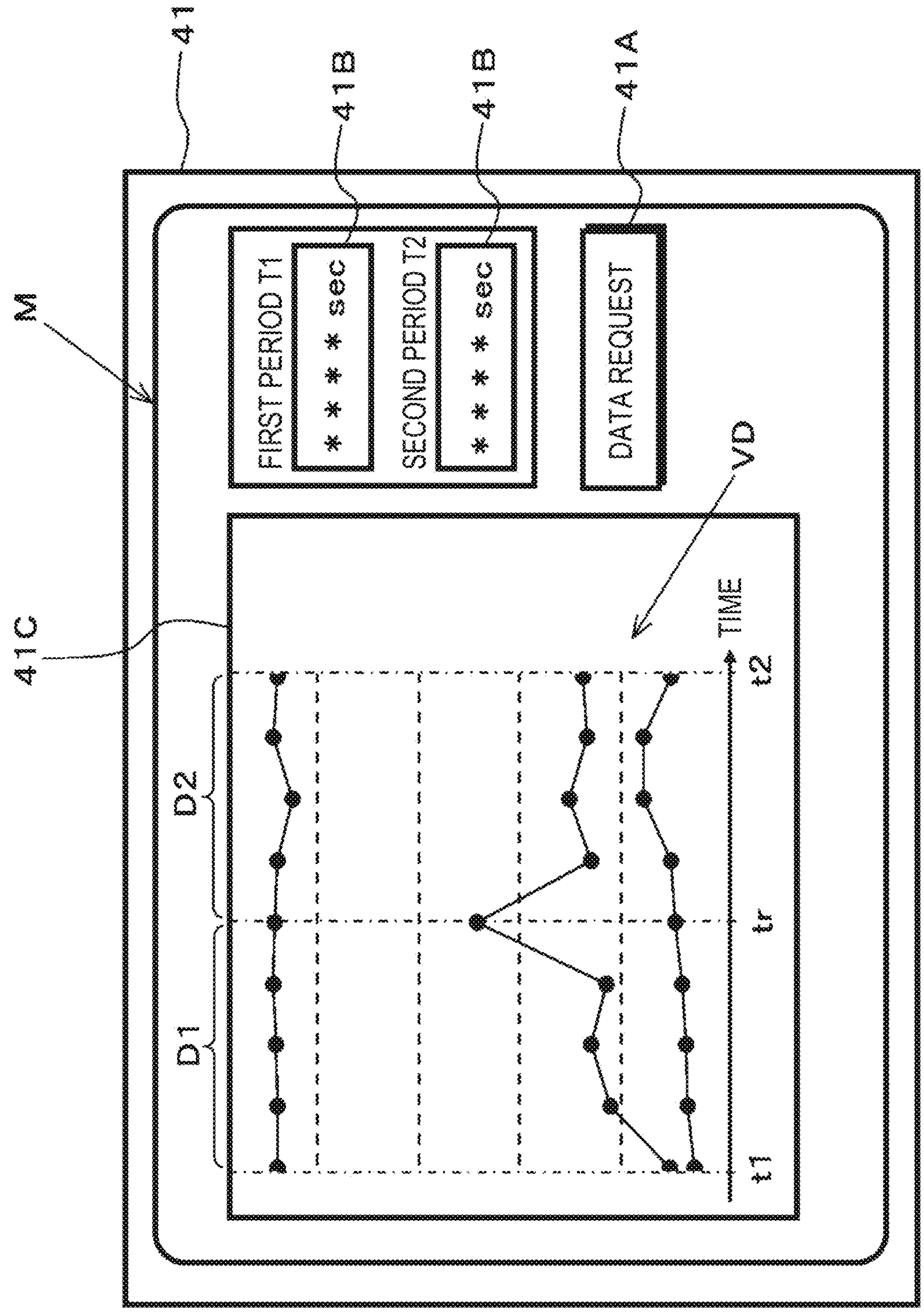
FIG. 3 is a diagram illustrating an example of a screen displayed on a display device illustrated in FIG. 1.

For example, in a case where the terminal device 40 is connected to the information collecting unit 30 via the information communication network N and a predetermined operation is performed in the terminal device 40, a screen M may be displayed on the display device 41 as illustrated in FIG. 3. The screen M includes a data range input field 41B, a data request button 41A, and a data display part 41C. The data range input field 41B is configured such that the first period T1 and the second period T2 can be input as numerical values (for example, the number of seconds or the like). Input to the data range input field 41B and an operation on the data request button 41A are executed by using a user interface of the terminal device 40.

A first period T1 corresponds to a period ranging from transmission command timing tr for operation data to timing t1 before the transmission command timing tr. A second period T2 corresponds to a period ranging from the transmission command timing tr for operation data to timing t2 after the transmission command timing tr. The first period T1 and the second period T2 (namely, the timings t1 and t2) are each variable due to adjustment of a numerical value to be input. The first period T1 and the second period T2 are each adjusted longer than the sampling cycle of the information collection unit 30. The transmission command timing tr is the timing at which a transmission command for operation data is issued from the terminal device 40 to the information collection unit 30 in response to an operation on a data request button 41A.

On a screen M, the first period T1 and the second period T2 are each input into a data-range input box 41B. Then, in response to an operation on the data request button 41A, a data setter 40B sets the range of operation data and additionally a data requester 40A issues, to the information collection unit 30 (control device 30A), a transmission command for the operation data in the set range. The set range of operation data corresponds to the first period T1 and the second period T2 between which the transmission command timing tr is interposed, in other words, the range from the timing t1 to the timing t2 (refer to FIG. 4).

After transmission of the operation data from the information collection unit 30, in response to arrival of the operation data at the terminal device 40, a data processor 40C processes the operation data into visualized data VD, followed by display of the visualized data VD on a display 41C in the screen M. In the present embodiment, the visualized data VD is a graph including the output signal from each electronic device 7 and indicating a continuous change over time every cycle of sampling. More specifically, in response to arrival of first operation data D1 in the range corresponding to the first period T1 and second operation data D2 in the range corresponding to the second period T2 at the terminal device 40, the data processor 40C combines the first operation data D1 and the second operation data D2 together, followed by display of a graph ranging from the timing t1 to the timing t2 as the visualized data VD (refer to FIG. 3).

A display device 41 is, for example, a monitor connected to the terminal device 40 and displays, through the screen M, the visualized data VD resulting from the processing by the data processor 40C. A user can visually recognize the visualized data VD displayed by the display device 41, so that a trend of change in the visualized data VD can be analyzed.

A communicator 40D establishes a connection between the information-communication network N and the terminal device 40. The communicator 40D receives the operation data transmitted from the information collection unit 30. The communicator 40D transmits, by wireless communication, to the information-communication network N, a request for operation data made by the data requester 40A and the range of operation data set by the data setter 40B. A transmission command for operation data and the range of operation data are transmitted to the information collection unit 30 through the information-communication network N.

Storage and Transmission of Operation Data with Information Collection Unit

Figure 4:
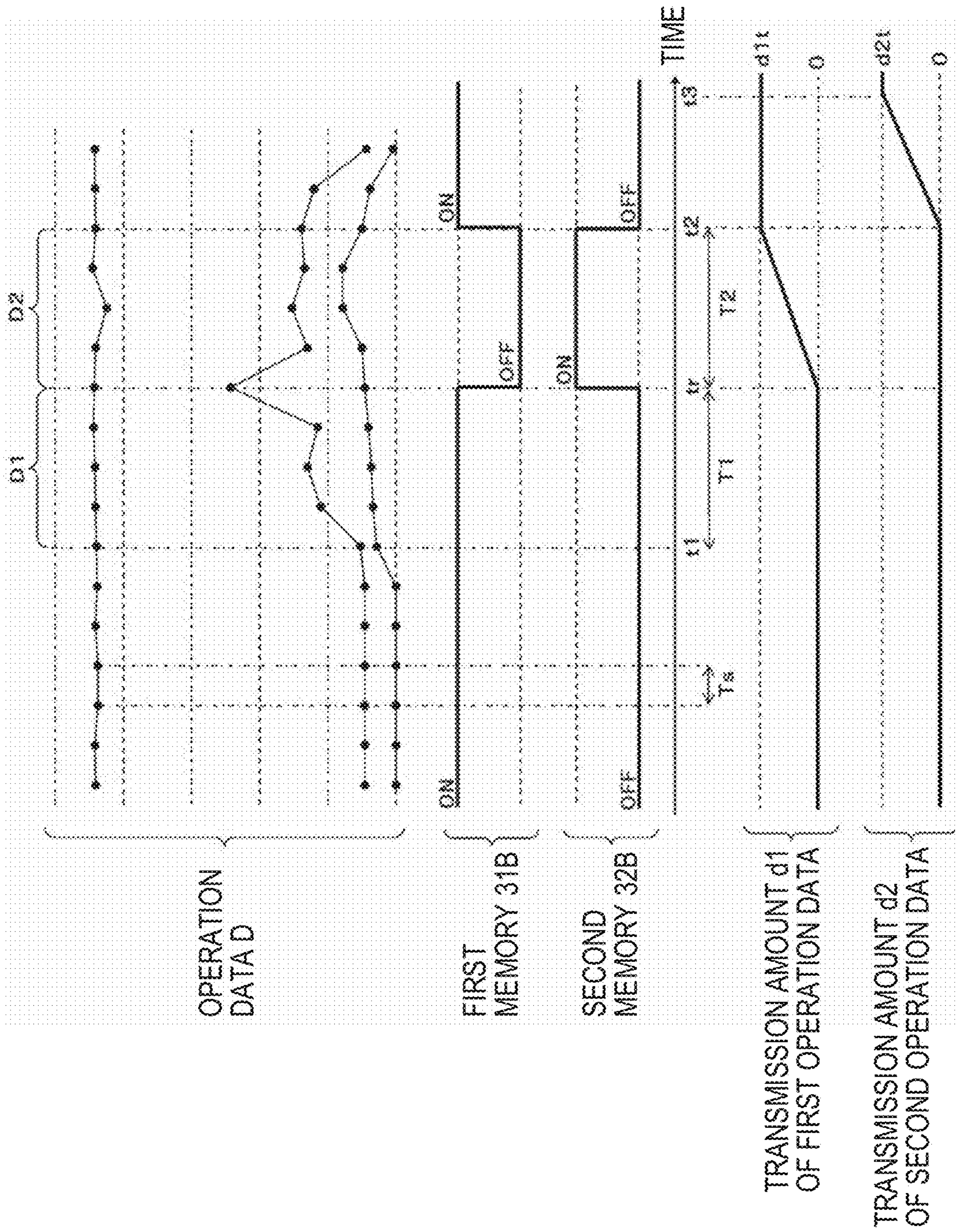
FIG. 4 is a time chart illustrating temporal changes of in-vehicle data configured of an output signal of an electronic device included in the backhoe illustrated in FIG. 1 and operations of a first storage portion and a second storage portion included in the backhoe.

As illustrated in FIG. 4, the information collection unit 30 samples the output signal from each electronic device 7 every cycle of sampling Ts to form operation data D. When the backhoe 1 starts up, signal outputting from each electronic device 7 and sampling start and then continue at all times. Thus, formation of the operation data D continues at all times from the start-up of the backhoe 1.

When the backhoe 1 starts up, the control device 30A performs storage of the formed operation data D into the first memory 31B and stops storage to the second memory 32B. In the present embodiment, ring buffering is used for storage into the first memory 31B. Note that, in the timing charts of the first memory 31B and the second memory 32B in FIG. 4, "ON" indicates the state where storage processing is being performed by the control device 30A, and "OFF" indicates the state where storage processing is kept stopped by the control device 30A.

Note that exemplary operations of the first memory 31B and the second memory 32B in FIG. 4 are the operations in one lane of n number of lanes (RAM1, eMMC1), (RAM2, eMMC2), . . . , and (RAMn, eMMCn) and may be different from the operations in the other lanes.

For example, after the backhoe 1 starts up, the terminal device 40 issues a transmission command for operation data, and then the transmission command timing tr arrives. When acquiring the transmission command for operation data at the transmission command timing tr, the control device 30A brings the first memory 31B from "ON" to "OFF" and brings the second memory 32B from "OFF" to "ON". Thus, the operation data D is stored into the first memory 31B until the transmission command timing tr, and the operation data D is stored into the second memory 32B from the transmission command timing tr. That is, when acquiring the transmission command for operation data, the control device 30A makes a switch from the first memory 31B to the second memory 32B, followed by storage of the operation data D.

At the transmission command timing tr, the range of operation data is transmitted together with the transmission command from the terminal device 40. That is, at the transmission command timing tr, the information collection unit 30 receives the first period T1 and the second period T2 input through the terminal device 40. In response to the reception, the communication device 30C transmits, to the terminal device 40, the first operation data D1 in the range corresponding to the first period T1 (in the range from the timing t1 to the transmission command timing tr) from the operation data D stored in the first memory 31B. That is, when acquiring the transmission command for operation data, the control device 30A stops storage of the operation data D with the ring buffer in the first memory 31B and additionally causes the communication device 30C to transmit the first operation data D1 stored in the first memory 31B.

From the transmission command timing tr to the timing t2, the transmission amount d1 of the first operation data D1 stored in the first memory 31B increases from zero to a data amount d1*t*. The data amount d1*t* is the data amount of the first operation data D1 stored in the first memory 31B in the first period T1. The data amount d1*t* may be determined, for example, based on the first period T1, the cycle of sampling Ts, and the number of electronic devices 7. Herein, the first period T1 is adjusted longer than the cycle of sampling Ts.

The second period T2 corresponds to the period over which the transmission amount d1 of the first operation data D1 increases from zero to the data amount d1*t*. In the present embodiment, the rate of transmission of the first operation data D1 is adjusted to the second period T2 set through the terminal device 40, so that the timing at which transmission of all the first operation data D1 stored in the first memory 31B is completed is identical to the end of the second period T2 (timing t2).

When the second period T2 elapses from the transmission command timing tr (when the timing t2 arrives), the first memory 31B returns from "OFF" to "ON", and the second memory 32B returns from "ON" to "OFF". Thus, the operation data D is stored into the second memory 32B in the second period T2 from the transmission command timing tr (in the period from the transmission command timing tr to the timing t2), and storage of the operation data D is resumed to the first memory 31B after the elapse of the second period T2 (from the timing t2). That is, when the transmission amount d1 of the first operation data D1 stored in the first memory 31B reaches a threshold (data amount d1*t*) or more, the control device 30A resumes storage of the operation data D with the ring buffer in the first memory 31B.

When the second period T2 elapses from the transmission command timing tr (when the timing t2 arrives), the communication device 30C transmits, to the terminal device 40, the second operation data D2 in the range corresponding to the second period T2 (in the range from the transmission command timing tr to the timing t2) from the operation data D stored in the second memory 32B. That is, when the transmission amount d1 of the first operation data D1 stored in the first memory 31B reaches the threshold (data amount d1*t*) or more, the control device 30A causes the communication device 30C to transmit the second operation data D2 stored in the second memory 32B.

From the timing t2 to timing t3, the transmission amount d2 of the second operation data D2 stored in the second memory 32B increases from zero to a data amount d2*t*. The data amount d2*t* is the data amount of the second operation data D2 stored into the second memory 32B in the second period T2. The data amount d2*t* may be determined, for example, based on the second period T2, the cycle of sampling Ts, and the number of electronic devices 7. Herein, the second period T2 is adjusted longer than the cycle of sampling Ts.

As above, the first operation data D1 and the second operation data D2 in the range corresponding to the first period T1 and the second period T2 between which the transmission command timing tr is interposed (in the range from the timing t1 to the timing t2) in the operation data D are transmitted from the information collection unit 30 to the terminal device 40 through the information-communication network N. Then, the transmitted first operation data D1 and second operation data D2 in the range of t1 to t2 are processed as the visualized data VD in the terminal device 40, followed by display by the display device 41 (refer to FIG. 3).

Practical Operation

Figure 5:
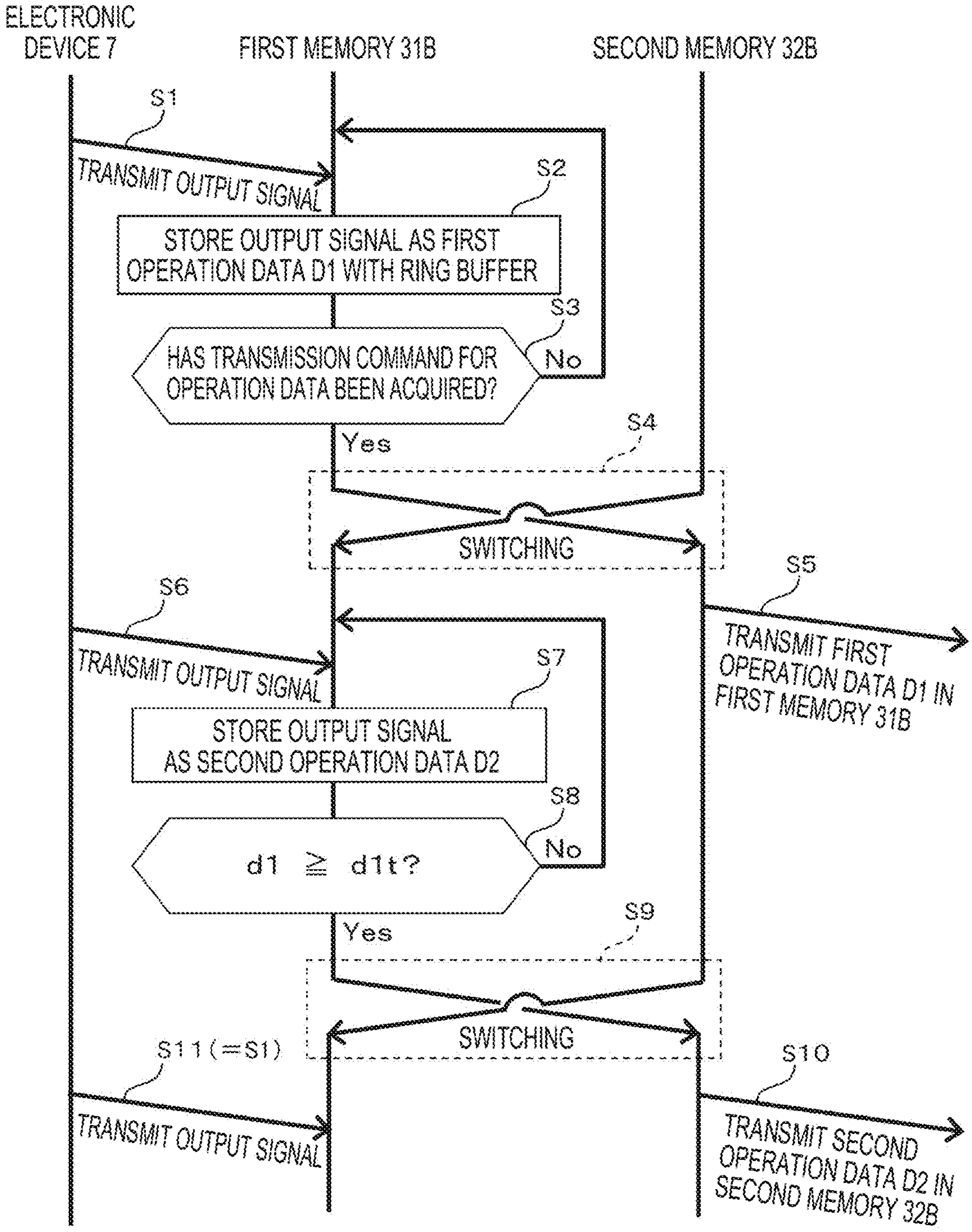
FIG. 5 is a flowchart of the operations of a first memory and a second memory included in the operation data support system illustrated in FIG. 1.

FIG. 5 is a flowchart of the operation of the operation data support system S for industrial machinery. Due to start-up of the backhoe 1, the information collection unit 30 and the terminal device 40 are each connected to the information-communication network N such that data communication is allowed (refer to FIGS. 1 and 2).

The output signal from an electronic device 7 in the backhoe 1 is transmitted to the first memory 31B in the information collection unit 30 through the in-vehicle network N1 (S1). The first memory 31B stores, with the ring buffer, the transmitted output signal as the first operation data D1 (S2). The control device 30A determines whether or not a transmission command for operation data has been acquired from the terminal device 40 (S3). If "No" results from the determination, the processing goes back to step S2, and then the first memory 31B stores the first operation data D1.

In step S3, if "Yes" results from the determination, the memory part is switched at the transmission command timing tr (S4). With the first memory 31B to which storage is kept stopped, the first operation data D1 stored in the first memory 31B is transmitted to the terminal device 40 through the information-communication network N (S5). Meanwhile, the output signal from the electronic device 7 in the backhoe 1 is transmitted to the second memory 32B in the information collection unit 30 through the in-vehicle network N1 (S6). The second memory 32B stores the transmitted output signal as the second operation data D2 (S7). The control device 30A determines whether or not the transmission amount d1 of the first operation data D1 is the threshold (data amount d1*t*) or more (S8). If "No" results from the determination, the processing goes back to step S7, and then the second memory 32B stores the second operation data D2.

In step S8, if "Yes" results from the determination, the storage part is switched at the timing t2 (S9). With the second memory 32B to which storage is kept stopped and the first memory 31B to which storage is resumed, the second operation data D2 stored in the second memory 32B is transmitted to the terminal device 40 through the information-communication network N (S10). Meanwhile, the output signal from the electronic device 7 in the backhoe 1 is transmitted to the first memory 31B, to which storage is resumed, through the in-vehicle network N1 (S11). Step S11 is identical to step S1 and thus the processing from step S2 is subsequently repeated.

Second Embodiment

In the first embodiment, the operation data support system S includes the first memory 31B and the second memory 32B as the memory device 30B. An operation data support system S for industrial machinery according to a second embodiment of the present invention includes a memory device 30B including a third memory 33B in addition to a first memory 31B and a second memory 32B, in which the third memory 33B stores operation data. The second embodiment is different from the first embodiment in that the third memory 33B is provided. The difference between the second embodiment and the first embodiment will be described below.

Figure 6:
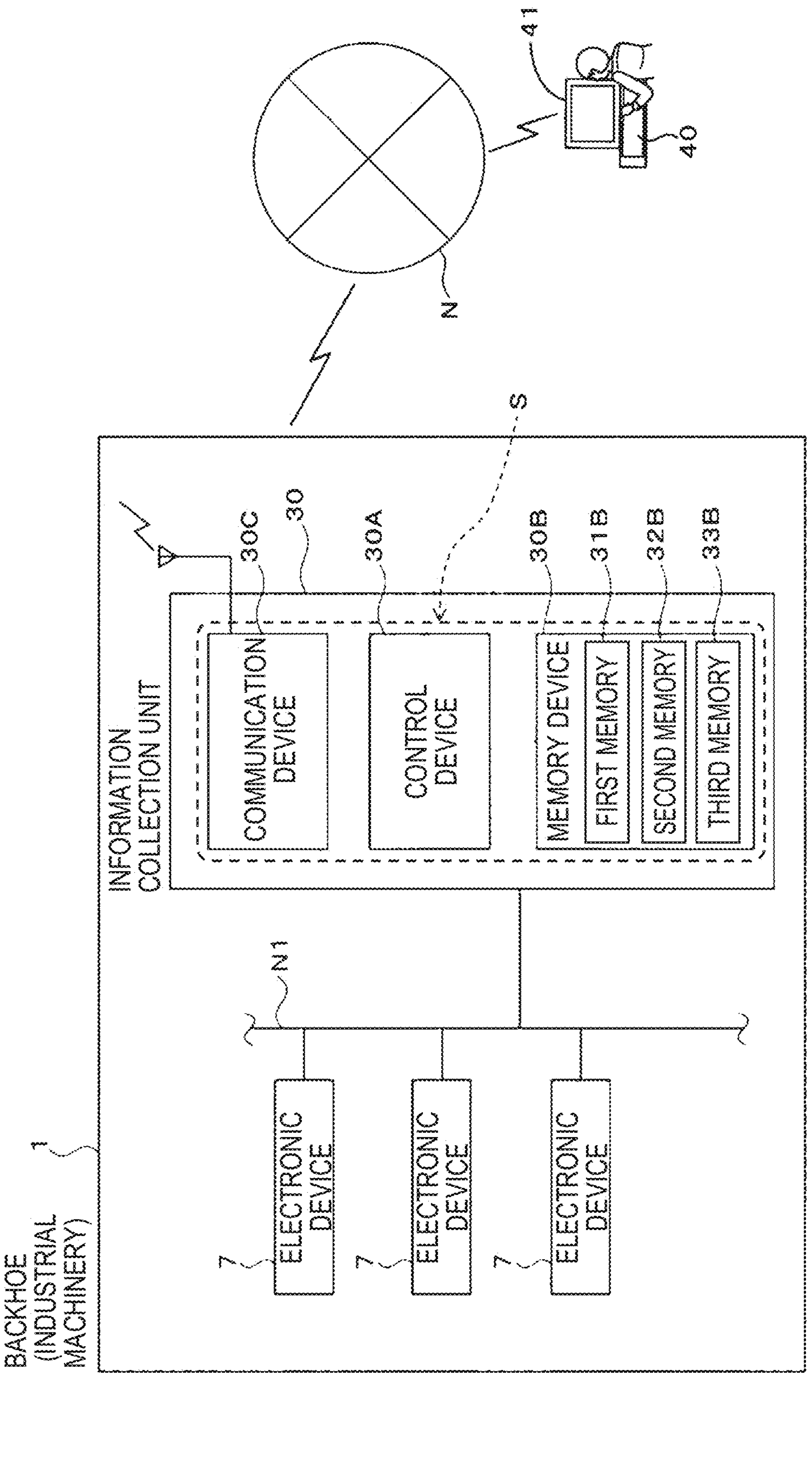
FIG. 6 illustrates functional blocks of a backhoe including an operation data support system for industrial machinery (backhoe) according to a second embodiment of the present invention, an information-communication network, and a terminal device.

As illustrated in FIG. 6, a backhoe 1 (industrial machinery) is provided with the third memory 33B (third memory device) that is different from the first memory 31B and the second memory 32B and stores operation data. In the memory device 30B in the operation data support system S in the second embodiment, the first memory 31B, the second memory 32B, and the third memory 33B are integrated together.

In the second embodiment, a control device 30A controls the third memory 33B. The control device 30A stores operation data into the third memory 33B during transmission of the operation data stored in the second memory 32B. More specifically, before transmission of first operation data D1 and second operation data D2 to an information-communication network N, the third memory 33B temporarily stores all the first operation data D1 and the second operation data D2. After temporary storage into the third memory 33B as a buffer, the stored data is transmitted to the information-communication network N.

In the second embodiment, after completion of storage into the third memory 33B, the control device 30A resumes storage kept stopped to the first memory 31B. No processing to stop (start) storage is performed to the second memory 32B. For example, due to exchange of pointer information, storage processing may be performed.

Figure 7:
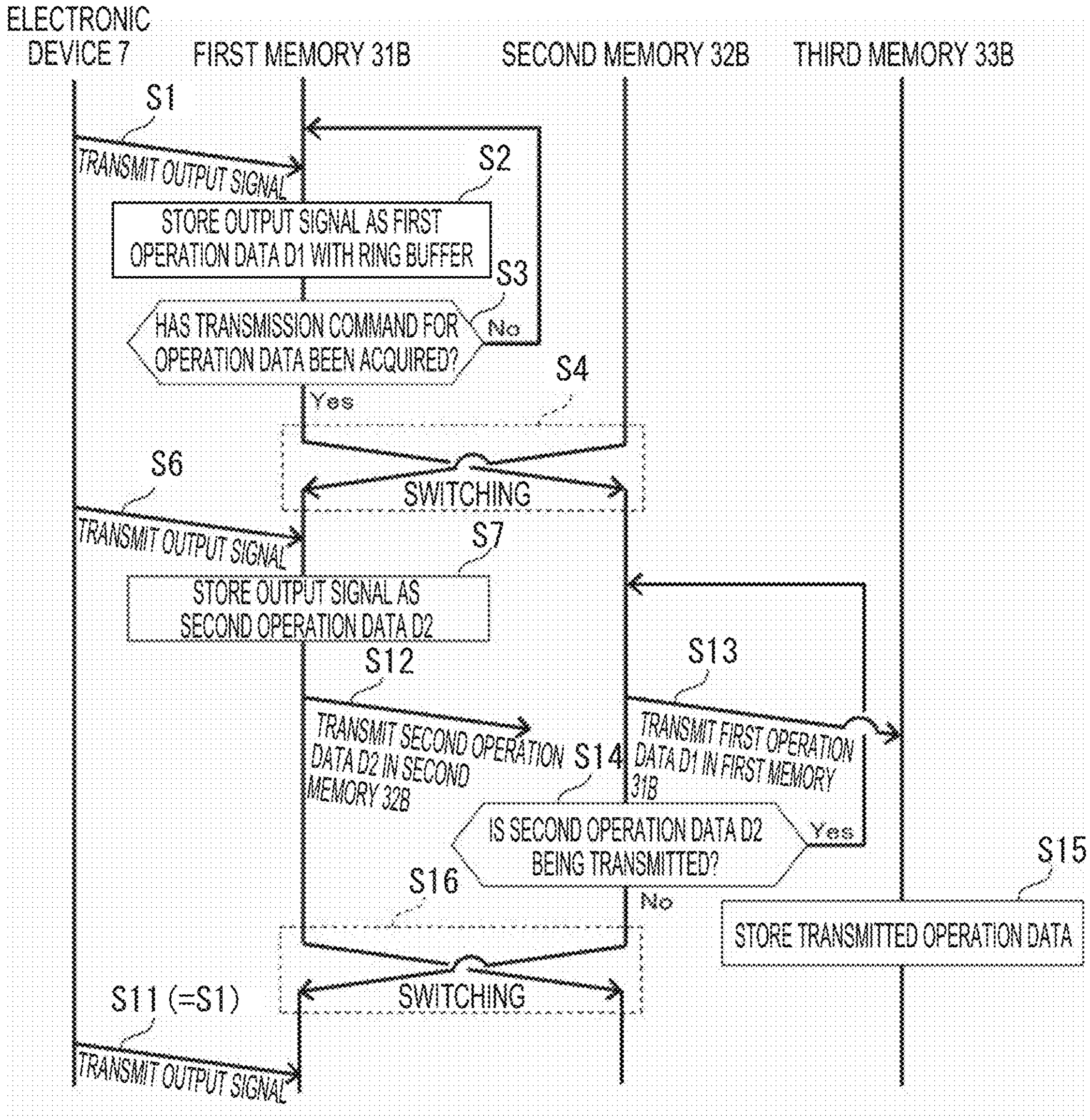
FIG. 7 is a flowchart of the operations of a first memory, a second memory, and a third memory included in the operation data support system illustrated in FIG. 6.

FIG. 7 is a flowchart of the operation of the operation data support system S according to the second embodiment. The flowchart corresponds to the flowchart in FIG. 5 to which the operation of storage processing of the third memory 33B is added. Steps in FIG. 7 the same as or equivalent to steps in FIG. 5 are denoted with the same reference signs and thus descriptions thereof will be omitted.

In step S4, the storage part is switched. In step S6, the output signal from an electronic device 7 is transmitted to the second memory 32B. Then, in step S7, the output signal is stored as second operation data D2 into the second memory 32B. Next, the second operation data D2 is transmitted to the third memory 33B, followed by temporary storage. Then, the second operation data D2 is transmitted to a terminal device 40 through the information-communication network N (S12).

Herein, the transmission amount d2 of the second operation data D2 increases from zero to a data amount d2*t* (to the data amount of the second operation data D2 stored in the second memory 32B), similarly to that in the first embodiment. That is, from the start of transmission of the second operation data D2 until the transmission amount d2 reaches the data amount d2*t*, data transmission of the second operation data D2 continues. When the transmission amount d2 reaches the data amount d2*t*, the data transmission of the second operation data D2 is completed.

Meanwhile, after the storage part is switched in step S4, first operation data D1 stored in the first memory 31B is transmitted to the third memory 33B (S13). The control device 30A determines whether or not the second operation data D2 is being transmitted (S14). If "Yes" results from the determination, the processing goes back to step S13. The first operation data DI is transmitted to the third memory 33B and then is stored into the third memory 33B (S15). Note that, as the determination in step S14, if the transmission amount d2 of the second operation data D2 is a threshold (data amount d2*t*) or less, the determination may result in "during transmission". The first operation data D1 temporarily stored in the third memory 33B in step S15 is transmitted to the terminal device 40 through the information-communication network N, similarly to the second operation data D2 described above.

If "No" results from the determination in step S14, the storage part is switched (S16), followed by resumption of storage to the first memory 31B. In step S11, the output signal from the electronic device 7 is transmitted to and stored into the first memory 31B to which storage is resumed.

Summary

As described above, an operation data support system S for industrial machinery according to an embodiment of the present invention includes a first memory 31B, a second memory 32B, a communication device 30C, and a control device 30A. The first memory 31B, with which a backhoe 1 is provided, stores, with a ring buffer, operation data regarding the backhoe 1. The second memory 32B, with which the backhoe 1 is provided, is different from the first memory 31B and stores operation data. The communication device 30C, with which the backhoe 1 is provided, transmits, outward from the backhoe 1, the operation data stored in either the first memory 31B or the second memory 32B. The control device 30A, with which the backhoe 1 is provided, controls the first memory 31B, the second memory 32B, and the communication device 30C. When acquiring a transmission command for operation data, the control device 30A stops storage of operation data with the ring buffer in the first memory 31B and additionally causes the communication device 30C to transmit first operation data D1 stored in the first memory 31B.

According to this, from operation data D formed through an in-vehicle network N1 in the backhoe 1, the first operation data D1 before transmission command timing tr can be stored with the ring buffer into the first memory 31B. For example, the first operation data D1 stored in the first memory 31B can be used for a graph corresponding to the output signal from an electronic device 7 and indicating a continuous change over time every cycle of sampling. The first operation data D1 can be extracted for analysis from the operation data D. The first operation data D1 is transmitted outward from the backhoe 1. Thus, with the first operation data D1 outside, a trend of change in the first operation data D1 before the transmission command timing tr can be properly analyzed. Therefore, at a place remote from the backhoe 1, the operation condition of a part corresponding to the electronic device 7 can be grasped easily and accurately. In particular, diagnosis with the operation data can be made easily and accurately.

Examples of places remote from the backhoe 1 include a rental company, a repair company, and a manufacturer. Without going from such places to the actual place at which the backhoe 1 is located, for example, determination of repair details, arrangements for components, or arrangements for an alternative can be made promptly based on a diagnostic outcome. As a result, an improvement can be made in service.

When acquiring a transmission command for operation data, the control device 30A makes a switch from the first memory 31B to the second memory 32B for storage of second operation data D2. According to this, after the transmission command timing tr, storage is allowed to the second memory 32B, instead of the first memory 31B to which storage is kept stopped. Therefore, from the operation data D formed through the in-vehicle network N1 in the backhoe 1, the second operation data D2 after the transmission command timing tr can be stored into the second memory 32B. For example, the second operation data D2 stored in the second memory 32B can be used for a graph corresponding to the output signal from the electronic device 7 and indicating a continuous change over time every cycle of sampling that follows that of the first operation data D1. Therefore, in addition to the first operation data D1, the second operation data D2 can be extracted for analysis from the operation data D. The first operation data D1 and the second operation data D2 are transmitted outward from the backhoe 1. Thus, with the first operation data D1 and the second operation data D2 outside, a trend of change in the first operation data D1 and the second operation data D2 before and after the transmission command timing tr can be properly analyzed. Therefore, the first operation data D1 and the second operation data D2 before and after the transmission command timing tr can be used for analysis and thus the part corresponding to the electronic device 7 can be diagnosed further accurately.

When the transmission amount dt of the first operation data D1 stored in the first memory 31B reaches a threshold d1*t* or more, the control device 30A resumes storage of operation data kept stopped to the first memory 31B with the ring buffer. According to this, storage can be resumed to the first memory 31B after transmission of the first operation data D1, so that transmission of the first operation data D1 and storage into the first memory 31B can be repeatedly performed. For example, adjustment of the threshold d1*t* or adjustment of the rate of transmission of the first operation data D1 enables adjustment of the timing of resumption of storage to the first memory 31B.

When the transmission amount dt of the first operation data D1 stored in the first memory 31B reaches the threshold d1*t* or more, the control device 30A causes the communication device 30C to transmit the second operation data D2 stored in the second memory 32B. According to this, the second operation data D2 can be reliably transmitted after transmission of the first operation data D1. For example, adjustment of the threshold d1*t* or adjustment of the rate of transmission of the first operation data D1 enables adjustment of the timing of transmission of the second operation data D2.

The control device 30A is capable of stopping storage of operation data into the second memory 32B. According to this, at the time of storage of the first operation data D1 into the first memory 31B, storage can be stopped to the second memory 32B, so that storage processing can be reliably performed to the first memory 31B. A reduction can be made in processing load by the amount of storage stopped to the second memory 32B.

The operation data support system S includes a third memory 33B. The third memory 33B, with which the backhoe 1 is provided, is different from the first memory 31B and the second memory 32B and stores operation data. The control device 30A controls the third memory 33B and stores operation data into the third memory 33B during transmission of the second operation data D2 stored in the second memory 32B. According to this, before transmission of operation data to an information-communication network N outside the backhoe 1, the operation data can be temporarily stored into the third memory 33B. That is, the third memory 33B can be used as a buffer, enabling appropriate transmission of operation data responsive to the communication condition in the information-communication network N.

The first memory 31B and the second memory 32B are integrated together. The first memory 31B and the second memory 32B integrated together can be easily unitized/modularized together with other devices (e.g., the control device 30A and the communication device 30C).

Modifications

In the embodiment, a terminal device 40 is provided outside the backhoe 1. The terminal device 40 and an information collection unit 30 in the backhoe 1 are connected through the information-communication network N. The terminal device 40 issues a transmission command for operation data to the information collection unit 30 and receives operation data from the information collection unit 30. That is, a single device not only issues a transmission command for operation data and but also receives operation data. Instead of this, for example, provided may be separate devices of which one issues a transmission command for operation data and the other receives operation data. More specifically, two terminal devices may be provided mutually separately outside the backhoe 1 such that one of the two terminal devices issues a transmission command for operation data and the other receives operation data. Inside the backhoe 1, an operator may issue a transmission command for operation data, and a terminal device outside the backhoe 1 may receive operation data.

In the embodiment, when the transmission amount d1 of the first operation data D1 in the first memory 31B reaches the threshold d1*t* or more, storage kept stopped to the first memory 31B is resumed and the second operation data D2 in the second memory 32B is transmitted. Herein, the threshold d1*t* corresponds to all the data amount of the first operation data D1 in a first period T1. Instead of this, for example, the threshold d1*t* may be changed to a data amount smaller than all the data amount in the first period T1. The timing of resumption of storage to the first memory 31B and the start timing of transmission of the second operation data D2 in the second memory 32B may be identical to or different from each other.

In the embodiment, when the transmission amount d1 of the first operation data D1 in the first memory 31B reaches the threshold d1*t* or more, storage kept stopped to the first memory 31B is resumed and the second operation data D2 in the second memory 32B is transmitted. Instead of this, for example, in response to the elapse of a predetermined period (at predetermined timing) from the transmission command timing tr for operation data, storage kept stopped to the first memory 31B may be resumed and the second operation data D2 in the second memory 32B may be transmitted.

In the embodiment, a transmission command for operation data is transmitted from the terminal device 40, but this is not limiting. For example, the backhoe 1 or a device that establishes wired or wireless connection communicably with the backhoe 1 may be provided with a command device (not illustrated) that transmits a transmission command for operation data to the control device 30A. Alternatively, the control device 30A may be provided with the command device.

In response to fulfillment of a predetermined transmission condition, the command device may generate a transmission command and output the transmission command to the control device 30A. Examples of the predetermined transmission condition include occurrence of a predetermined error condition (e.g., detection of abnormality by various types of sensors in the backhoe 1 or a shutdown of a device due to abnormality), the arrival of a predetermined transmission time (e.g., the arrival of a predetermined time, the elapse of a predetermined period, or the elapse of a predetermined operating time), and detection of a predetermined operation input.

It should be understood that the embodiments disclosed herein are illustrative in all respects and not restrictive. The scope of the present invention is shown not by the above description but by the claims, and it is intended that meanings equivalent to the claims and all modifications within the scope are included.

What is claimed is:

1. A sensor data support system for industrial machinery, comprising:

a rotational speed sensor, a fuel sensor, a water temperature sensor, a hydraulic sensor, and a rotational angle sensor, collectively providing sensor data;

a first memory device with which the industrial machinery is provided, the first memory device having a ring buffer, and being configured to store the sensor data in the ring buffer, wherein in response to new sensor data being stored within the ring buffer, old sensor data within the ring buffer having been previously stored is deleted;

a second memory device with which the industrial machinery is provided, the second memory device being different from the first memory device, the second memory device being configured to store the sensor data;

a communication device with which the industrial machinery is provided, the communication device transmitting, outward from the industrial machinery, the sensor data stored in either the first memory device or the second memory device; and a control device with which the industrial machinery is provided, the control device controlling the first memory device, the second memory device, and the communication device, wherein the control device being programmed to:

switch between the first and second memory devices such that only one of the first and second memory devices are storing new sensor data at the same time;

default store new operation data to the ring buffer of the first memory device such that new sensor data is not stored in the second memory device;

in response to acquiring a transmission command for the operation data, the control device stops storage of new sensor data with the ring buffer in the first memory device, switches to the second memory device to store new sensor data, and additionally causes the communication device to transmit the sensor data stored in the first memory device;

in response to the amount of sensor data transmitted from the first memory device reaching a predetermined threshold, resumes with the first memory as the default to store new sensor data.

2. The sensor data support system according to claim 1, wherein when a transmission amount of the sensor data stored in the first memory device reaches the predetermined threshold, the control device causes the communication device to transmit the sensor data stored in the second memory device.

3. The sensor data support system according to claim 1, wherein the control device is capable of stopping storage of the sensor data into the second memory device.

4. The sensor data support system according to claim 1, further comprising a third memory device with which the industrial machinery is provided, the third memory device being different from the first memory device and the second memory device, wherein the control device controls the third memory device, and stores, during transmission of the sensor data stored in the second memory device, the sensor data into the third memory device.

5. The sensor data support system according to claim 1, wherein the first memory device and the second memory device are integrated together.

* * * * *